United States Patent [19]

Aida

[11] Patent Number: 4,943,170
[45] Date of Patent: Jul. 24, 1990

[54] BEARING HOLDING ARRANGEMENT IN SUPERCHARGER

[75] Inventor: Masahiro Aida, Yokohama, Japan

[73] Assignee: Nissan Motor Company, Ltd., Yokohama, Japan

[21] Appl. No.: 340,749

[22] Filed: Apr. 20, 1989

[30] Foreign Application Priority Data

Apr. 26, 1988 [JP] Japan .................................. 63-55169

[51] Int. Cl.$^5$ ........................................... F16C 27/02
[52] U.S. Cl. ...................................... 384/99; 384/518; 417/407
[58] Field of Search .................. 384/99, 517, 518, 535, 384/581; 417/407

[56] References Cited

U.S. PATENT DOCUMENTS

| | | |
|---|---|---|
| 3,186,779 | 6/1965 | Chapman et al. |
| 3,811,741 | 5/1974 | McInerney. |
| 4,708,602 | 11/1987 | McEachern, Jr. et al. ..... 384/535 X |
| 4,721,398 | 1/1988 | Miyashita et al. .................... 384/99 |
| 4,721,441 | 1/1988 | Miyashita et al. ............. 384/518 X |
| 4,738,548 | 4/1988 | Zloch et al. ......................... 384/99 |
| 4,798,523 | 1/1989 | Glaser et al. .................. 384/518 X |

FOREIGN PATENT DOCUMENTS

| | | |
|---|---|---|
| 0021738 | 1/1981 | European Pat. Off. |
| 0230885 | 8/1987 | European Pat. Off. |
| 0272151 | 6/1988 | European Pat. Off. |
| 2449820 | 9/1980 | France. |
| 2569771 | 3/1986 | France. |
| 61-134536 | 8/1986 | Japan. |
| 312365 | 2/1956 | Switzerland. |

*Primary Examiner*—Thomas R. Hannon
*Attorney, Agent, or Firm*—Lowe, Price, LeBlanc, Becker & Shur

[57] ABSTRACT

In a supercharger, a pair of oil film dampers are installed by way of oil films on an inner circumferential wall of a bearing housing and respectively install thereon ball bearings for a rotor shaft. A hollow, generally cylindrical thrust member selectively abuts at the opposite axial ends upon the dampers, whereby to hold the oil film dampers, the ball bearings and therefore the rotor shaft in place relative to the bearing housing. The thrust member is fixed to the bearing housing by a pin received in a tangential groove of the thrust member, i.e., a groove elongated in parallel to a tangential line of a circular cross section of the thrust member.

9 Claims, 4 Drawing Sheets

FIG. 9 *(PRIOR ART)*
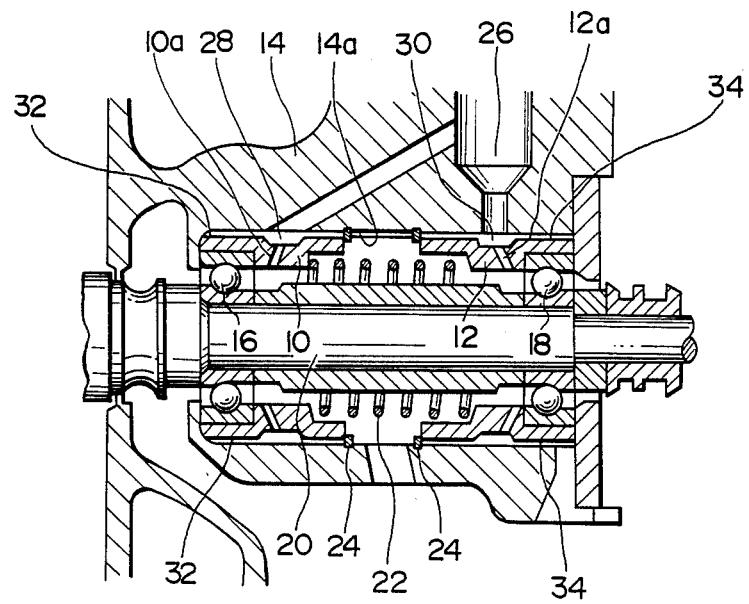
FIG. 10 *(PRIOR ART)*
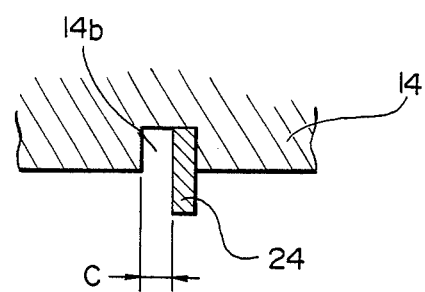

BEARING HOLDING ARRANGEMENT IN SUPERCHARGER

BACKGROUND OF THE INVENTION

1. Field of the Invention

The present invention relates in general to superchargers for automotive internal combustion engines or the like and more particularly to a bearing holding arrangement in a supercharger.

2. Description of the Prior Art

An example of a bearing holding arrangement in a supercharger is disclosed in Japanese Provisional Utility Model Publication No. 61-134536 and also shown in FIG. 9.

Referring to FIG. 9, the bearing holding arrangement includes a pair of oil film dampers 10, 12 installed, by way of oil films, on an inner circumferential wall 14a of a bearing housing 14 and a pair of ball bearings 16, 18 the outer rings of which are respectively installed on the oil film dampers 10, 12. The inner rings of the ball bearings 16, 18 are installed on a turbine shaft or rotor shaft 20 and stationarily held thereon. The oil film dampers 10, 12 are axially urged away from each other by a coil spring 22 so that the outer rings of the ball bearings 16, 18 are resiliently held in place relative to the inner rings. A pair of stopper rings 24, 24 are installed on the inner circumferential wall 14a of the bearing housing 14 so that the oil film dampers 10, 12 selectively abut upon the stopper rings 24, 24 to hold the ball bearings 16, 18 and therefore the rotor shaft 20 axially in place relative to the bearing housing 14.

In use, lubricating oil is supplied from an oil supply port 26 to annular chambers 28, 30 and then through passages 10a, 12a to the ball bearings 16, 18 to lubricate and cool the same and at the same time supplied to annular spaces 32, 34 between the dampers 10, 12 and the inner circumferential wall 14a of the bearing housing 14 to form thereat oil films. The ball bearings 16, 18 are thus installed in a floating state within the bearing housing 14 and therefore vibrations of the rotor shaft 20 are absorbed by the oil films for thereby eliminating or at least reducing the otherwise occuring noise and improving the durabilities of the rotor shaft 20 and ball bearings 16, 18.

With such a prior art bearing holding arrangement, the stopper rings 24, 24 are expected to hold or locate the rotor shaft 20 axially in place relative to the bearing housing 14. In this connection, if the locational accuracy by the stopper rings 24, 24 is low, the clearances between the turbine wheel and compressor wheel and their associated inner walls of turbine and compressor housings cannot be maintained at suitable values, thus deteriorating the operational efficiency of the supercharger. Accordingly, the locational accurancy by the stopper rings 24, 24 needs to be maintained high.

However, with the prior art stopper ring arrangement, it is quite difficult to maintain the locational accuracy high. That is, as shown in FIG. 10, in order that the stopper rings 24, 24 can assuredly and easily fit in grooves 14b, 14b formed in the inner circumferential wall 14a of the bearing housing 14, it is necessary for each groove 14b to have an axial clearance "C". When the clearance "C" is small, the efficiency of the work for installation of the stopper rings 24, 24 is considerably lowered. When the clearance "C" is large, the positions of the stopper rings 24, 24 vary largely within the limit of the clearance "C", thus causing a problem that it is impossible for the stopper rings 24, 24 to locate or hold the oil film dampers 10, 12, the ball bearings 16, 18 and therefore the rotor shaft 20 accurately in place.

SUMMARY OF THE INVENTION

In accordance with the present invention, there is provided an improved bearing holding arrangement in a supercharger. The arrangement comprises a bearing housing, a pair of oil film dampers installed in a floating state in the bearing housing, a pair of ball bearings installed on the oil film dampers, a rotor shaft extending through the bearing housing and rotatably installed in same by way of the ball bearings and the oil film dampers, a spring urging the oil film dampers away from each other, a hollow, generally cylindrical thrust member disposed between the oil film dampers and abuttingly engageable with same selectively, a tangetial groove formed in the thrust member, a hole formed in the bearing housing and axially alignable with the groove when the thrust member is installed in place relative to the bearing housing and a pin fitted in the groove and the hole.

The above arrangement is effective for overcoming the above noted problem inherent in the prior art device.

It is accordingly an object of the present invention to provide a bearing holding arrangement in a supercharger which can hold ball bearings, oil film dampers and therefore a rotor shaft accurately in place without making the assembly or installation work difficult.

It is another object of the present invention to provide a bearing holding arrangement of the above described character which is compact in size and therefore light in weight.

It is a further object of the present invention to provide a bearing holding arrangement of the above described character which can attain a reliable operation of the supercharger.

It is a further object of the present invention to provide a bearing holding arrangement of the above described character which can increase the operational efficiency of the supercharger.

It is a further object of the present invention to provide a bearing holding arrangement of the above described character which can be assembled with ease and therefore can reduce the assemblying expense.

BRIEF DESCRIPTION OF THE DRAWINGS

FIG. 9 is a view similar to FIG. 1 but shows a prior art bearing holding arrangement; and FIG. 10 is an enlarged fragmentary view of the arrangement of FIG. 9 for showing the detail of a stopper ring and its associated bearing housing.

DESCRIPTION OF THE PREFERRED EMBODIMENT

Figure 1:
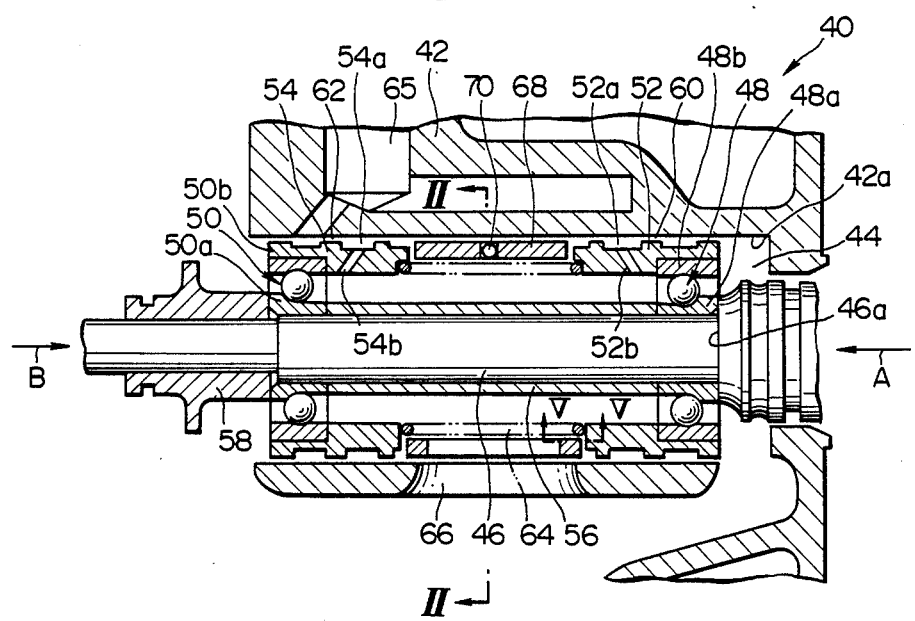
FIG. 1 is a sectional view of a bearing holding arrangement in a supercharger according to an embodiment of the present invention.

Referring first to FIG. 1, a bearing holding arrangement 40 for a supercharger according to an embodiment of the present invention includes a bearing housing 42 having a cylindrical chamber 44 and a turbine shaft or rotor shaft 46 extends through the chamber 44 of the bearing housing 42 to install on the opposite ends thereof, though not shown a turbine wheel and compressor wheel. The rotor shaft 46 is rotatably supported on an inner circumferential wall 42a of the bearing housing 42 defining the chamber 44 by means of a pair of ball bearings 48, 50 and a pair of oil film dampers 52, 54 which are hollow, generally cylindrical. Specifically, the ball bearing 48 and oil film damper 52 are positioned on the turbine wheel side, and the ball bearing 50 and oil film damper 54 are located on the compressor wheel side. Inner rings 48a, 50a of the ball bearings 48, 50 are stationarily held on the rotor shaft 46, i.e., the inner ring 48a is held between a spacer 56 and a shoulder 46a of the rotor shaft 46 and the inner ring 50a is held between the spacer 56 and an oil thrower 58 fixedly attached to the rotor shaft 46. Outer rings 48b, 50b of the ball bearings 48, 50 are installed on the oil film dampers 52, 54, respectively. Oil films 60, 62 are adapted to be formed between the oil film dampers 52, 54 and the inner circumferential wall 42a of the bearing housing 42 so that the ball bearings 48, 50 and the oil film dampers 52, 54 are supported on the inner circumferential wall 42a of the bearing housing 42 in a floating state. A coil spring 64 is placed around the rotor shaft 46 and between the oil film dampers 52, 54 for urging the dampers 52, 54 away from each other.

The oil film dampers 52, 54 are so shaped as to define annular chambers 52a, 54a between the inner circumferential wall 42a of the bearing housing 42 and the oil film dampers 52, 54. The oil film dampers 52, 54 are also formed with oil passages 52b, 54b communicating the annular chambers 52a, 54a which in turn communicate a lubricating oil supply port 65 for introducing lubricating oil to the ball bearings 48, 50. An outlet port 66 is formed in the bearing housing 42 for allowing lubricating to leave the bearing housing 42 therethrough.

A hollow, generally cylindrical thrust member 68 is placed around the coil spring 64 and between the oil film dampers 52, 54. The thrust member 68 is held stationary relative to the bearing housing 42 so that the oil film dampers 52, 54 selectively abut upon the opposite axial ends of the thrust member 68. That is, the thrust member 68 is axially held in place relative to the bearing housing 42 by means of a location pin 70 fixed to the bearing housing 42.

The thrust member 68 sustains, by way of the turbine side ball bearing 48 and turbine side oil film damper 52, a thrust load directed toward the compressor wheel (not shown), i.e., in the direction of the arrow A and, by way of the compressor side ball bearing 54 and the compressor side oil film damper 54, a thrust load directed toward the turbine wheel (not shown), i.e., in the direction of the arrow B.

Figure 2:
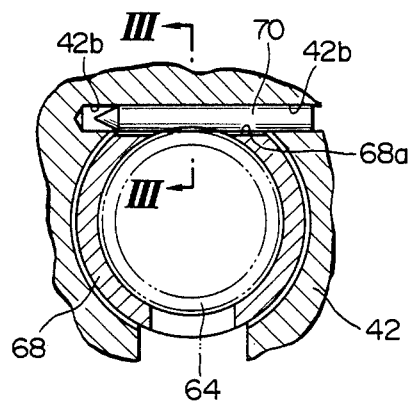
FIG. 2 is a sectional, partly enlarged view taken along the line II—II of FIG. 1.
Figure 3:
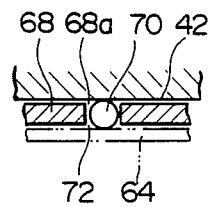
FIG. 3 is a sectional view taken along the line III—III of FIG. 2.

Referring additionally to FIGS. 2 and 3, the thrust member 68 is formed with a tangential groove 68a having a rectangular cross section, i.e., a groove 68a elongated in a tangential direction, in other words, elongated in parallel to a tangential line of a circular cross section of the thrust member 68 or elongated in such a way as to intersect the center line of the thrust member 68 at right angles when observed in a plan view. More specifically, the groove 68a is straightly elongated so as to have a planar bottom which is located slightly nearer the center axis of the thrust member 68 beyond a portion of the inner circumferential wall 68b of same.

The location pin 70 has a circular cross section and a pointed or conical end and is sized so as to accurately fit in the groove 68a. The location pin 70 is inserted into a hole 72 defined by the groove 68a and the inner circumferential wall 42a of the bearing housing 42. The insertion of the location pin 70 is performed through a hole 42b formed in the bearing housing 42. The hole 42b has a circular cross section and is sized so that the location pin 70 accurately fits in the hole 42b. More specifically, the hole 42b is elongated in parallel to the tangential line of the inner circumferential wall of the bearing housing 42 and partially open to the inside of the bearing housing 42 so that the location pin 70 is partially received in the groove 68a when the thrust member 68 is installed in place relative to the bearing housing 42. The hole 42b has a longitudinal end opening to the outside of the bearing housing 42 and the other longitudinal end which is closed. In this connection, it is to be noted that the hole 42b is partially open to the inside of the bearing housing 42 in such a way that the location pin 70 has end portions fitted in the bearing housing 42 and a portion which is located between the end portions and is fitted in the groove 68a, whereby a rigid interengagement is attained between the bearing housing 42 and the thrust member 68.

The thrust member 68 is formed, at the opposite axial ends for abutment with the oil film dampers 52, 54, with projections 68b, 68b whereas the oil film dampers 52, 54 are formed, at the opposite axial ends for abutment with the thrust member 68, with grooves 52c, 54c for receiving therewithin the projections 68b, 68b, respectively. By the engagement of these projections 68b, 68b and the grooves 52b, 54b, the oil film dampers 52, 54 are prevented from rotation together with the rotor shaft 46.

In use, lubricating oil is supplied through the oil supply port 65 to the oil film forming sections 60, 62 between the oil film dampers 52, 54 and the inner circumferential wall 42a of the bearing housing 42 to absorb vibrations of the rotor shaft 46. The lubricating oil is also supplied through the annular chambers 52a, 54a and the passages 52b, 54b to the ball bearings 48, 50 to lubricate and cool the same.

From the foregoing, it will be understood that the above arrangement of this invention can hold the ball bearings 48, 50 and therefore the rotor shaft 46 accurately in place relative to the bearing housing 42 since the thrust member 68 is adapted to abut at the opposite axial ends thereof upon the oil film dampers 52, 54 to locate the same, and the thrust member 68 is accurately installed in place relative to the bearing housing 42 when the location pin 70 and the hole 42b are accurate in diameter and the groove 68a is accurate in width.

It will be further understood that the desiredly accurate diameters of the location pin 70 and the hole 42b and the desiredly accurate width of the groove 68a can be attained with ease.

Figure 4:
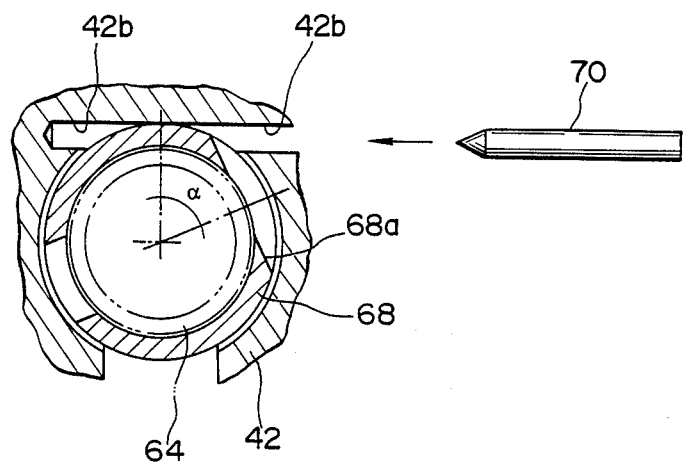
FIG. 4 is a view showing how a location pin is installed in place.
Figure 5:
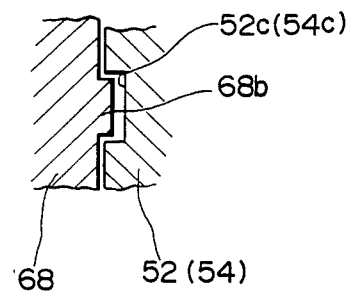
FIG. 5 is an enlarged sectional view taken in the direction V—V of FIG. 1.
Figure 6:
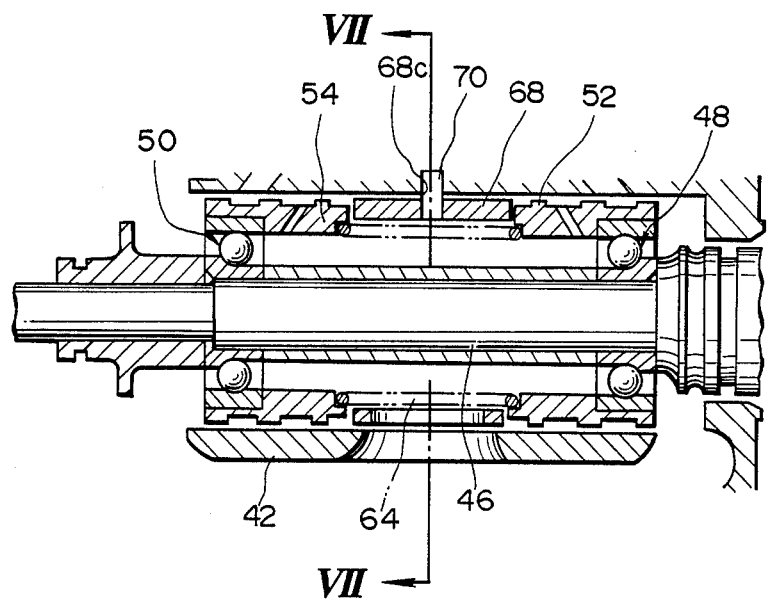
FIG. 6 is a view similar to FIG. 1 but shows a bearing holding arrangement according to a variant of the present invention.
Figure 7:
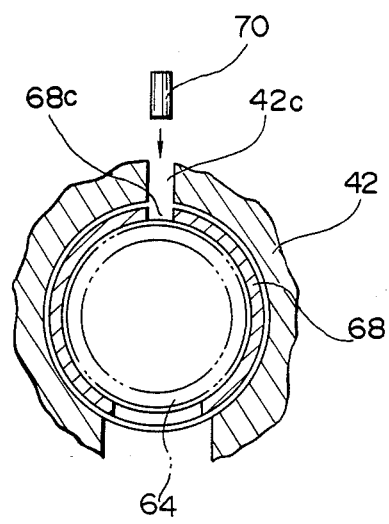
FIG. 7 is a sectional view taken along the line VII—VII of FIG. 6.
Figure 8:
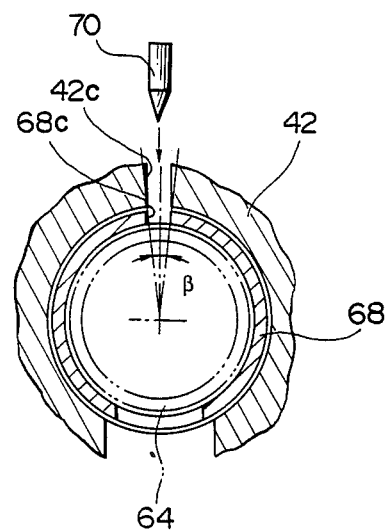
FIG. 8 is a view similar to FIG. 7 but shows another variant of the present invention.

It will be further understood that the above arrangement of this invention can easily install the thrust member 68 in place since the allowable positional difference between the thrust member 68 and the bearing housing 42 is large as indicated by the angle α in FIG. 4. In this connection, as shown in FIGS. 6 and 7, it is considered to form in the thrust member 68 a circular radial hole 68c into which the location pin 70 is inserted, in place of the tangential groove 68a. When this is the case, it is required, upon installation of the location pin 70, a difficult work for aligning the holes 42c, 68c with each other, resulting in a low working efficiency. In order to solve this problem, it is also considered, as shown in FIG. 8, to provide the location pin 70 with a pointed or conical end so that the positional differential between the holes 42c, 68c as indicated by the angle β is allowable. As compared with the angle β, the angle α attained by the arrangement of FIGS. 1 to 5 is far larger.

It will be further understood that the above arrangement of this invention is effective for attaining a thin-walled thrust member. In this connection, the arrangement shown in FIGS. 6 to 8 requires a thick-walled thrust member 68 in order to prevent the interference between the location pin 70 and the coil spring 64. The arrangement of this invention is thus effective for making the supercharger compact in size and light in weight.

It will be further understood that the term "supercharger" having been herein utilized is intended to indicate not only a supercharger mechanically driven by means of, for example, gearing to a crankshaft of an engine but a supercharger driven by the force of the exhaust gases and usually called a turbocharger.

What is claimed is:

1. A bearing holding arrangement in a supercharger, comprising:
    a bearing housing;
    a pair of oil film dampers installed in a floating state in said bearing housing;
    a pair of ball bearings installed on said oil film dampers;
    a rotor shaft extending through said bearing housing and rotatably installed in same by way of said ball bearings and said oil film dampers;
    a spring urging said oil film dampers away from each other;
    a hollow, generally cylindrical thrust member disposed between said oil film dampers and abuttingly engageable with same selectively;
    a tangetial groove formed in said thrust member;
    a hole formed in said bearing housing and axially alignable with said groove when said thrust member is installed in place relative to said bearing housing; and
    a pin fitted in said groove and said hole.

2. The arrangement according to claim 1 wherein said groove has a rectangular cross section and elongated in parallel to a tangential line of a circular outer cross section of said thrust member.

3. The arrangement according to claim 2 wherein said groove has a planar bottom which is located nearer a center axis of said thrust member beyond a portion of an inner circumferential wall of said thrust member.

4. The arrangement according to claim 3 wherein said pin has a circular cross section and a conically pointed end.

5. The arrangement according to claim 4 wherein said hole has a circular cross section and is partially open to the inside of said bearing housing in such a way that said pin has end portions fitted in said bearing housing and a portion which is located between said end portions and is fitted in said groove.

6. The arrangement according to claim 1, further comprising means for engaging said oil film dampers to said thrust member in such a way that said oil film dampers are axially movable but against rotation relative to said thrust member.

7. The arrangement according to claim 6 wherein said enaging means comprises projections provided to opposite ends of said thrust member and grooves formed in end portions of said oil film dampers to receive therein said projections, respectively.

8. The arrangement according to claim 1 wherein said ball bearing has inner rings fixedly installed on said rotor shaft and outer rings installed on said oil film dampers.

9. The arrangement according to claim 1 wherein said oil film dampers cooperate with an inner circumferential wall of said bearing housing to define annular spaces for forming oil films.

* * * * *